US009467077B2

(12) United States Patent
Rambaud et al.

(10) Patent No.: US 9,467,077 B2
(45) Date of Patent: Oct. 11, 2016

(54) METHOD AND ARCHITECTURE FOR PROCESSING ELECTRICAL ENERGY REGENERATED FROM AN AIRCRAFT

(75) Inventors: Julien Rambaud, Echarcon (FR); Sebastien Vieillard, La Chapelle Gauthier (FR)

(73) Assignee: LABINAL POWER SYSTEMS, Blagnac (FR)

( * ) Notice: Subject to any disclaimer, the term of this patent is extended or adjusted under 35 U.S.C. 154(b) by 678 days.

(21) Appl. No.: 13/885,103

(22) PCT Filed: Nov. 22, 2011

(86) PCT No.: PCT/FR2011/052724
§ 371 (c)(1),
(2), (4) Date: May 13, 2013

(87) PCT Pub. No.: WO2012/069755
PCT Pub. Date: May 31, 2012

(65) Prior Publication Data
US 2013/0229053 A1   Sep. 5, 2013

(30) Foreign Application Priority Data

Nov. 23, 2010   (FR) ..................... 10 59612

(51) Int. Cl.
*B60L 1/00*   (2006.01)
*B60L 3/00*   (2006.01)
(Continued)

(52) U.S. Cl.
CPC . *H02P 3/14* (2013.01); *B60L 7/20* (2013.01); *B60R 16/0307* (2013.01); *H02P 3/18* (2013.01); *Y02T 10/642* (2013.01)

(58) Field of Classification Search
CPC ........ H02P 3/14; B60R 16/0307; B60L 7/20; B64D 33/00
USPC ................................ 307/9.1, 10.1
See application file for complete search history.

(56) References Cited

U.S. PATENT DOCUMENTS 5,650,713 A   7/1997  Takeuchi et al.
5,714,851 A * 2/1998  Antony .................. B60L 3/003
                                                          318/148

(Continued)

FOREIGN PATENT DOCUMENTS

EP    2 161 829    3/2010
EP    2 164 148    3/2010

(Continued)

OTHER PUBLICATIONS

International Search Report Issued Mar. 6, 2012 in PCT/FR11/52724 filed Nov. 22, 2011.

*Primary Examiner* — Rexford Barnie
*Assistant Examiner* — Rasem Mourad
(74) *Attorney, Agent, or Firm* — Oblon, McClelland, Maier & Neustadt, L.L.P.

(57) ABSTRACT

A method and architecture processing electrical energy regenerated from an aircraft, to address drawbacks posed by customary solutions for dissipating low energy of resistors, conventionally ceramics, which require a significant volume of ceramic and an additional power converter. The method and architecture return energy to an electric generator to convert the energy into mechanical energy. The architecture includes a reversible electric generator, driven by a thermal machine and configured to deliver an AC voltage, electric actuators, and a voltage converter circuit with multiple links. The circuit includes AC voltage rectifiers for voltage originating from the generator and power converters arranged on the multiple links to drive as many electric actuators. The converter circuit also includes a mechanism for electrical energy inverse transmission applied to the generator operating in a motor mode.

8 Claims, 2 Drawing Sheets

(51) Int. Cl.
*H02G 3/00* (2006.01)
*H02P 3/14* (2006.01)
*B60L 7/20* (2006.01)
*H02P 3/18* (2006.01)
*B60R 16/03* (2006.01)

(56) References Cited

U.S. PATENT DOCUMENTS

| | | | |
|---|---|---|---|
| 6,850,426 B2 | 2/2005 | Kojori et al. | |
| 8,299,738 B2* | 10/2012 | Rozman | B60L 11/1811 307/10.1 |
| 2003/0218887 A1 | 11/2003 | Kojori et al. | |
| 2008/0100135 A1* | 5/2008 | Lazarovich | H02J 5/00 307/9.1 |
| 2009/0045761 A1 | 2/2009 | Fuchs et al. | |
| 2009/0157234 A1* | 6/2009 | Breit | B64C 13/50 701/3 |
| 2009/0295314 A1* | 12/2009 | Ganev | H02P 23/06 318/376 |
| 2010/0066165 A1* | 3/2010 | Ganev | H02J 3/38 307/9.1 |
| 2010/0109581 A1* | 5/2010 | Sheahan, Jr. | B60L 7/14 318/376 |
| 2012/0089280 A1* | 4/2012 | Onsager | B60L 15/00 701/22 |

FOREIGN PATENT DOCUMENTS

| | | |
|---|---|---|
| JP | 60 187202 | 9/1985 |
| JP | 60 216704 | 10/1985 |

* cited by examiner

METHOD AND ARCHITECTURE FOR PROCESSING ELECTRICAL ENERGY REGENERATED FROM AN AIRCRAFT

TECHNICAL FIELD

The invention relates to a method and architecture intended for processing the energy regenerated by the electrical actuators of an aircraft, acting in particular upon taxiing operations.

The taxiing function consists in moving the airplane on the ground with the help of electrical actuators for instance located on the main gear so as to monitor the airplane speed by inducting decelerations. Such actuators also enable the airplane to brake on negative slope runways or in the case of rear winds. The actuators then return the deceleration or braking electrical energy to the network where such power is to be dissipated.

STATE OF THE ART

When the torque and speed signs of the actuators are identical (the product between the two parameters has a positive sign), the electrical architecture supplies energy to the actuators from an electrical generator: the architecture acts in a motive nominal mode. The electrical generator is driven by a thermal machine, generally an auxiliary power unit, in short APU (for "Auxiliary Power Unit").

When the torque and speed signs are opposed (the product between the two parameters has a negative sign), the actuators are so-called "helpers" and the command brakes the load by removing energy from the actuators. The architecture and the actuators then act in a generating mode for the "so-regenerated" energy.

In case of helper efforts, it is necessary to dissipate the regenerated energy at the level of the actuators under penalty of a quick increase of the voltage in the electrical network that can lead to a voltage rupture.

The current energy dissipation solutions are solutions based on resistors used for "burning out" energy. Conventionally, such energy is thus dissipated by Joule effect in ceramic resistors via a braking "chopper".

Such solutions are heavy and difficult to be optimized, since they require to perfectly know the energy to be dissipated in order to convert the whole regenerated energy. Moreover, in such strong power system type, the energy being dissipated requires a big ceramic volume and an extra power converter only dedicated to such braking function.

DISCLOSURE OF THE INVENTION

The invention aims at suppressing the disadvantages caused by the energy dissipation resistors. To do so, it proposes to return the energy back to the electrical generator of the architecture so as to convert such energy into mechanical energy.

More precisely, an object of the present invention aims at a processing method for the energy regenerated by reversible electrical actuators of an aircraft. In a nominal mode, a generator driven by a thermal machine supplies power to the actuators operating in a motive mode, via a voltage converting multi-way circuit. In a braking phase of at least one actuator, an electrical energy regeneration is produced by the actuator(s) then operating in an electrical energy generating mode via the corresponding way(s) of the circuit. The regenerated energy is transmitted to the generator in a motive mode through a reverse energy transmission from at least one actuator way. The so-converted energy is transmitted as mechanical energy to the thermal machine via the generator being piloted in a motive mode.

The reverse energy transmission is implemented by a dedicated link between at least one actuator way remained in a motive mode and the electrical generator. Alternatively, it can be carried out directly by the voltage converting circuit having total energy supply reversibility, from at least one of the multiple ways.

Advantageously, the converting circuit can be dedicated either to a taxiing function of an aircraft on the ground or to a starting function for the thermal machine. Furthermore, the mechanical energy produced by the generator in a motive mode can be supplied to the thermal machine and/or to an equipment of the aircraft (pump, alternator, etc.) being able to operate via power transfer mechanical adaptation means (reducers, returns, etc.).

The invention also relates to an architecture being able to implement such a method. Such architecture comprises a reversible electrical generator being driven by a thermal machine and able to deliver an alternative voltage, electrical actuators able to supply mechanical power to the aircraft, and a multi-link alternative voltage converter comprising alternative voltage rectifying means able to convert the alternative tension into a direct voltage. Power converters are arranged on said links, being supplied by the direct voltage emitted by the rectifying means and able to pilot as many electrical actuators. Connecting means, being mounted in bypass on at least one link of at least one power converter, are able to allow the generator to be piloted via a busbar so as to form the reverse energy transmission means from this or these power transmission converters, a direct voltage bus and the other converters that, being not bypassed, are energy suppliers. The converting circuit also comprises reverse electrical energy transmission means applied to the generator operating in a motive mode.

The rectifying means can consist in at least one rectifier or one converter.

Alternatively, the reverse energy transmission means can be directly made by the voltage converting circuit from at least one of the multiple ways, the rectifying and converting means being reversible. The rectifying means can then be formed by a reversible converter.

The electrical energy can then be supplied by actuators in a generating mode or by a direct voltage source to supply the thermal machine in a starting mode via the electrical generator.

According to particular embodiments:
- the source is a low voltage source connected to the bypassing means through an over-supplying inductor, that could be formed by a battery or a three-phase voltage source transmitted by a ground plug and converted into a direct voltage by a rectifier;
- the rectifying means are selected between at least one rectifier and a reversible converter and are coupled with a direct voltage bus supplying the actuators via the converters;
- the converters are selected amongst the DC-AC converters and H-shaped bridges;
- the connecting means are selected amongst contactors, switches and bistable flip-flops;
- the thermal machine is an auxiliary power unit or equivalent dedicated to the starting of the main engines of the aircraft and to the substitution of such engines in case of a failure.

SHORT DESCRIPTION OF THE FIGURES

Other aspects, characteristics and advantages of the invention will appear in the non limiting description to follow, relative to particular embodiments, in reference to the accompanying drawings wherein, respectively:

DETAILED DISCLOSURE OF EMBODIMENTS

Figure 1:
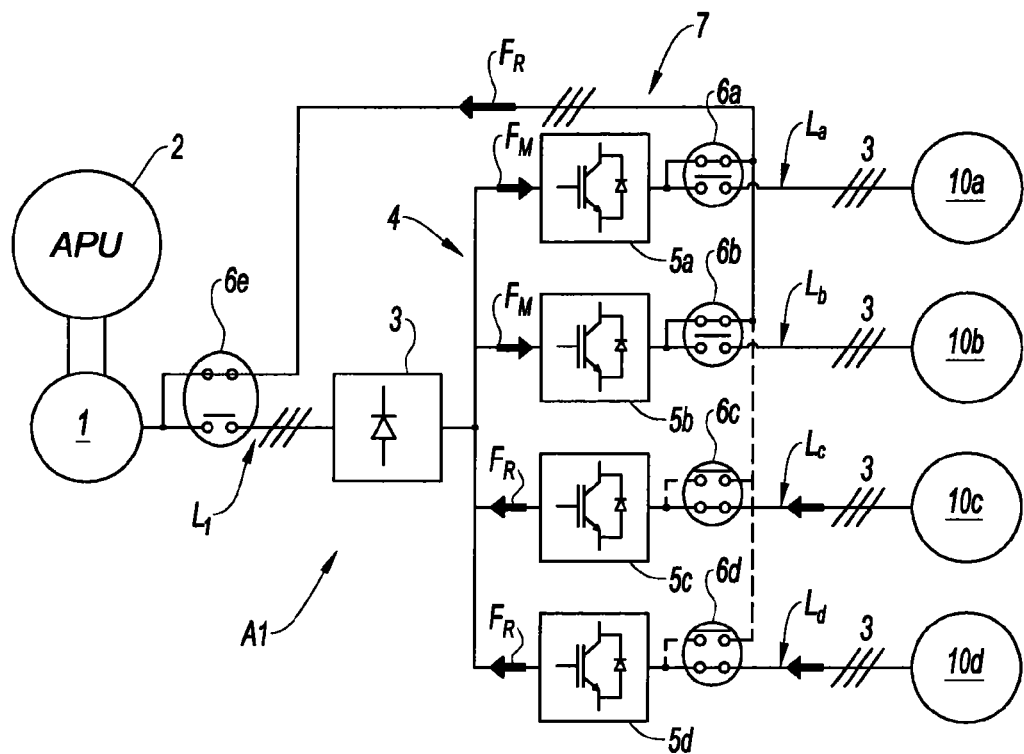
FIG. 1 is an architecture schema for processing the regenerated energy according to the invention comprising one bus dedicated to the reverse energy transmission.

Referring to the schema of FIG. 1, the architecture A1 for processing regenerated energy supplied by four electrical engines 10a to 10d used as actuators in the taxiing function, comprises:

one electrical generator 1 driven by one APU 2 as an auxiliary thermal source and delivering a three-phase alternative tension (with the symbol ///);

one diode passive rectifier 3 arranged at the output of the generator 1 on one link L1 for converting such three-phase voltage into a direct voltage "DC" transmitted to the input of a bus 4;

one "DC" voltage bus 4 (DC means "direct current") to supply each of the four engines 10a to 10d in a nominal mode via a corresponding DC-AC converter 5a to 5d, such DC-AC converters being reversible power converters so as to pilot in a three-phase voltage the corresponding engine on an electrical link La to Ld;

one set of double contactors 6a to 6d arranged in each of such links La to Ld between a DC-AC converter and the corresponding engine to be able to configure each link according to two operation modes of the engines 10a to 10d: a motive mode (arrows $F_M$) corresponding to the nominal mode for the taxiing function and a generating mode (arrows $F_R$) corresponding to the regenerated energy mode;

one busbar 7 dedicated to the implementation, in a generating mode, of electrical re-connections towards the generator 1 via the contactors 6a to 6d.

In a regenerated mode, at least one DC-AC converter, two DC-AC converters 5C and 5d in the illustrated example, is used to provide the braking and return (arrow $F_R$) energy over the voltage bus DC 4 through the corresponding DC-AC converters 5a and 5b.

Such energy recovered at the level of the voltage bus DC 4 is then returned back to the electrical generator 1 by using the remaining DC-AC converter(s), the two DC-AC converters 5a and 5b in the illustrated example, and the dedicated busbar 7. Such remaining DC-AC converters are then disconnected from their respective engines 10a and 10b by the contactors 6a and 6b configured in a regenerated mode. In the same way, the generator 1 is disconnected from the rectifier 3 and connected to the dedicated bus 7 via a contactor 6e. The generator 1 and the two remaining DC-AC converters 5a and 5b are thus connected together via the dedicated busbar 7.

The remaining DC-AC converters are then adapted to pilot the electrical generator 1 in a motive mode and to convert the electrical energy into mechanical energy at the level of the APU 2. Advantageously, the energy is thus returned back with no addition of an extra converter. Typically, a power of about 40 kW can be supplied to the APU.

Figure 2:
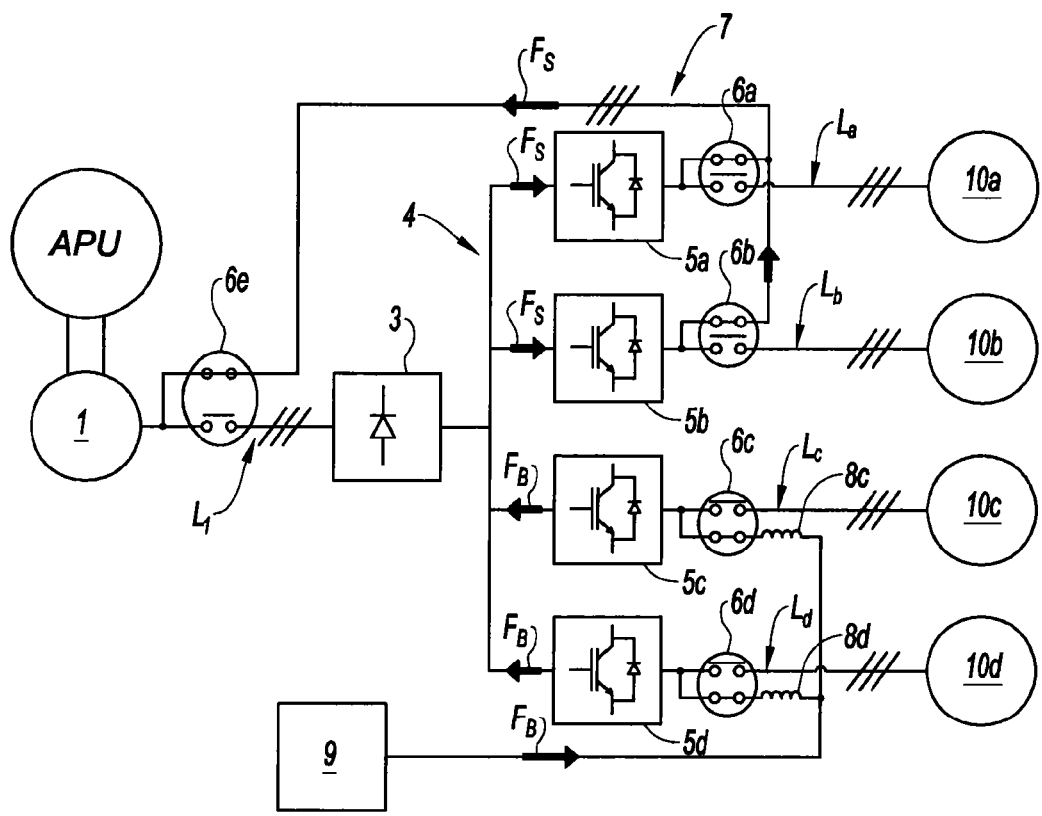
FIG. 2 is an architecture schema according to FIG. 1 in the case of a use in a starting mode for one APU, from a voltage source consisting in a battery.

The configuration of the architecture A1 according to FIG. 1 in a regenerated mode can also be used in a starting mode for the APU 2, as shown in FIG. 2.

The APU starting is made by using the generator 1 as a starter, i.e. in a "motive" mode, by supplying it with energy. Indeed, it is possible to start a generator such as the generator 1 from a low direct voltage.

To do so, the outputs of at least one DC-AC converter, two DC-AC converters 5c and 5d in the illustrated example, are advantageously connected on the links Lc and Ld—between the DC-AC converter and the corresponding contactor—through over-supplied inductors 8c and 8d (also called "boost self-induction coils") to a source of low direct voltage, here a battery 9.

Such DC-AC converters 5c and 5d are then piloted in a boost mode to increase the low direct voltage of the battery 9 into a direct voltage being implemented on the voltage bus DC 4 (arrows $F_B$). The remaining DC-AC converters 5a and 5b then pilot (arrows $F_S$) the generator 1 in a starter mode from the voltage thus created via the dedicated busbar 7 in a similar way to the operation in a regenerated mode according to FIG. 1.

The two DC-AC converters 5c and 5d are of course disconnected from their respective engines 10c and 10d by the contactors 6c and 6d and connected by such same contactors to the low direct voltage battery 9 via the boost self-induction coils 8c and 8d. The battery is a battery of 28 V equipping the airplane. Alternatively, the voltage can originate from a ground plug in the tarmac connected to a network of 3×115 V converted into 28 V.

Figure 3:
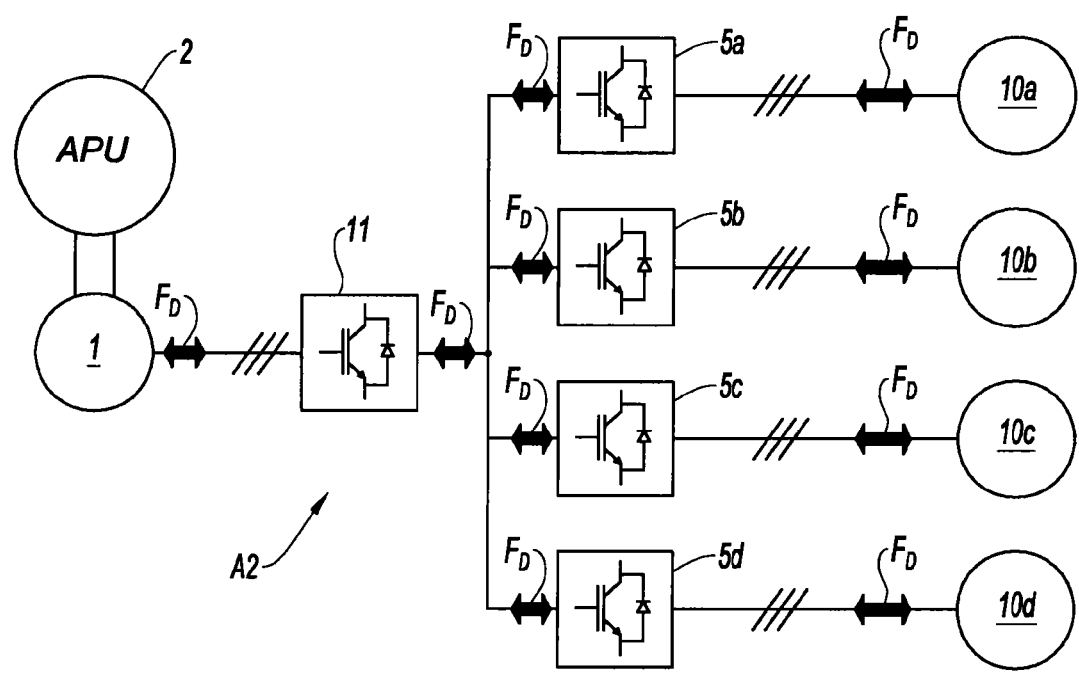
FIG. 3 is an alternative architecture schema comprising a reversible converter for the reverse energy transmission.

An alternative architecture A2 will be now presented in reference to FIG. 3. This architecture A2 comprises a reversible converter 11—here a DC-AC converter—instead of the passive rectifier 3, thereby allowing to get rid of the contactors and of the dedicated busbar 7.

Thus, the reversible converter 11 enables for the energy to pass from the generator 1 to the electrical engines 10a to 10d in a nominal mode. Such converter 11 also enables the energy return and the piloting in a motive mode of the generator 1 in an energy regeneration phase (double arrow $F_D$). It also enables APU2 starting by using the contactors, the boost self-induction coils and the direct voltage source according to FIG. 2.

The invention is not limited to the examples being described and represented. It is for example possible to use any type of contactor being switchable (switch, selector, SR flip-flop, etc.) or active power components (IGBT, MOS, diode, thyristor, etc.), converter (DC-AC converter, H-shaped bridge; etc.) and rectifier (diodes, thyristors, etc.) possibly coupled with a filter. Furthermore, any electrical distribution system being convenient could be used instead of the bus DC and the busbars above mentioned.

The invention claimed is:

1. A processing method for energy regenerated by reversible electrical actuators of an aircraft, the aircraft comprising:

a generator driven by a thermal machine;

a voltage converting multi-way circuit;

a plurality of actuators; and corresponding links that connect each actuator to the voltage converting multi-way circuit;

wherein:

the generator operates to generate power in a nominal mode;

the generator supplies power via the voltage converting multi-way circuit to the actuators;

the actuators operate in one of two operating modes, including: a motive mode that consumes energy; and an electrical energy generating mode that regenerates energy;

wherein the method comprises the steps of:
operating a first set of actuators in the generating mode to produce regenerated energy and supplying the regenerated energy through the corresponding links;
operating a second set of actuators in the motive mode;
transmitting regenerated energy to the generator through a reverse energy transmission from the first set of actuators through a dedicated link between the first set of actuators and the generator; and
converting the transmitted energy into mechanical energy by the thermal machine via the generator.

2. The processing method according to claim 1, wherein the voltage converting multi-way circuit is dedicated either to a taxiing function of an aircraft on the ground or to a starting function for the thermal machine.

3. The processing method according to claim 2, wherein the mechanical energy produced by the generator in the motive mode is supplied to at least one of the thermal machine and an equipment of the aircraft configured to operate via a power transfer mechanical adaptation means.

4. An architecture, comprising:
a generator driven by a thermal machine and configured to deliver an alternative voltage;
a voltage converting multi-way circuit comprising voltage rectifying means configured to convert the alternative voltage into a direct voltage, and power converters arranged on corresponding links, supplied by the direct voltage emitted by the rectifying means and configured to pilot a plurality of actuators;
connecting means, mounted in bypass on at least one corresponding link of at least one power converter, configured to allow the generator to be piloted via a busbar to form reverse energy transmission means from the power converters, a direct voltage bus and the other converters that, being not bypassed, are energy suppliers; and
the corresponding links connect each actuator to the voltage converting multi-way circuit,
wherein:
the generator operates to generate power in a nominal mode;
the generator supplies power via the voltage converting multi-way circuit to the actuators;
the actuators operate in one of two operating modes, including: a motive mode that consumes energy; and an electrical energy generating mode that regenerates energy; and
wherein:
a first set of actuators is operated in the generating mode to produce regenerated energy and supplying the regenerated energy through the corresponding links;
a second set of actuators is operated in the motive mode;
regenerated energy is transmitted to the generator through a reverse energy transmission from the first set of actuators through a dedicated link between the first set of actuators and the generator; and
the transmitted energy is converted into mechanical energy by the thermal machine via the generator.

5. The architecture according to claim 4, wherein the rectifying means includes at least one rectifier or one converter.

6. The architecture according to claim 4, wherein the electrical energy is supplied by a direct voltage source so as to supply the thermal machine in a starting mode via the generator.

7. The architecture according to claim 6, wherein the direct voltage source is a low voltage source connected to the connecting means through an over-supplying inductor, or by a battery or a three-phase voltage source transmitted by a ground plug and converted into a direct voltage by a rectifier.

8. The architecture according to claim 4, wherein the thermal machine is an auxiliary power unit or equivalent dedicated to starting of main engines of the aircraft and to substitution of the main engines in a case of a failure.

* * * * *